US011805033B2

(12) United States Patent
Leboyer et al.

(10) Patent No.: US 11,805,033 B2
(45) Date of Patent: *Oct. 31, 2023

(54) MONITORING OF IOT SIMULATED USER EXPERIENCE

(71) Applicant: Martello Technologies Corporation, Kanata (CA)

(72) Inventors: Antoine Leboyer, Geneva (CH); Gary Steere, Geneva (CH); Jean-Francois Piot, Geneva (CH)

(73) Assignee: Martello Technologies Corporation, Kanata (CA)

(*) Notice: Subject to any disclaimer, the term of this patent is extended or adjusted under 35 U.S.C. 154(b) by 0 days.

This patent is subject to a terminal disclaimer.

(21) Appl. No.: 17/522,232

(22) Filed: Nov. 9, 2021

(65) Prior Publication Data

US 2022/0070070 A1   Mar. 3, 2022

Related U.S. Application Data

(63) Continuation of application No. 16/966,507, filed as application No. PCT/EP2019/050216 on Jan. 7, 2019, now Pat. No. 11,196,645.

(Continued)

(51) Int. Cl.
*H04L 12/00*   (2006.01)
*H04L 41/5067*   (2022.01)
(Continued)

(52) U.S. Cl.
CPC .......... *H04L 41/5067* (2013.01); *H04L 43/50* (2013.01); *H04L 43/55* (2022.05); *H04L 67/562* (2022.05)

(58) Field of Classification Search
CPC . H04L 67/12; H04L 41/5067; H04L 63/0428; H04L 67/535; H04L 67/562;
(Continued)

(56) References Cited

U.S. PATENT DOCUMENTS 11,196,645 B2\*  12/2021  Leboyer .................. H04L 67/10
2013/0298218 A1\*  11/2013  Rash ........................ H04L 63/10
726/11

FOREIGN PATENT DOCUMENTS

EP          2421198 A1    2/2012

OTHER PUBLICATIONS

Office Action dated Oct. 4, 2022 in respect of corresponding Canadian Patent Application No. 3,088,466.

(Continued)

*Primary Examiner* — Frantz Coby
(74) *Attorney, Agent, or Firm* — Stratford Group Ltd.

(57) ABSTRACT

The present invention relates to a computer implemented method, preferably a computer implemented method, and a system, which have been designed to bridge a gap in the End User experience monitoring that has been created by the adoption of cloud based services by Enterprise customer by replicating exactly the actions performed by the user on a cloud based application in order to determine the true end user experience and alert in case of unexpected latency and also by analyzing at the same time the impacts of the Internet network and the local infrastructure of the Enterprise user on the end user experience of the cloud based application that is monitored.

20 Claims, 3 Drawing Sheets

Related U.S. Application Data

(60) Provisional application No. 62/625,016, filed on Feb. 1, 2018.

(51) Int. Cl.
*H04L 43/50* (2022.01)
*H04L 43/55* (2022.01)
*H04L 67/562* (2022.01)

(58) Field of Classification Search
CPC ......... H04L 67/10; H04L 43/55; H04L 67/02; H04L 43/50
USPC .................................. 709/224–226; 726/11
See application file for complete search history.

(56) References Cited

OTHER PUBLICATIONS

"Network Functions Virtualisation (NFV); Assurance; Report on Active Monitoring and Failure Detection", ETSI Draft France, vol. ISG-NFV, No. V-REL 004 V1.1.1; Sep. 1, 2017 (Sep. 1, 2017), pp. 1-61, XP014311792.
Office Action dated Jan. 2, 2023 for corresponding EP Application No. 19700207.4.
"Network Functions Virtualisation (NFV); Assurance; Report on Active Monitoring and Failure Detection", vol. ISG-NFV, No. V-REL 004 V1.1.1; Sep. 1, 2017 (Sep. 1, 2017), pp. 1-61, XP014311792.

\* cited by examiner

MONITORING OF IOT SIMULATED USER EXPERIENCE

CROSS-REFERENCE TO RELATED APPLICATIONS

This application is a continuation of and claims priority to U.S. patent application Ser. No. 16/966,507, filed Jul. 31, 2020, now allowed, which is a U.S. National Stage of International Application No. PCT/EP2019/050216, filed Jan. 7, 2019, which claims the benefit of and priority to U.S. Provisional Application No. 62/625,016, filed Feb. 1, 2018, each of which is hereby incorporated by reference herein in its entirety.

TECHNICAL FIELD

The present invention relates to a computer implemented method, preferably a computer implemented method, and a system, which have been designed to bridge a gap in the End User experience monitoring that has been created by the adoption of cloud based services by Enterprise customers.

BACKGROUND ART

Nowadays, enterprise are consuming more and more software that are delivered by "software as a service" company. With this delivery mode, the IT operation of enterprises are not in charge anymore of the installation, deployment, maintenance of the hardware and software that are necessary to run the concerned application. They just buy a service that deliver an access to the application through internet. Therefore, the IT operation have no control anymore on the health, performance and potential issues that application can experienced and that have impact on the end user experience.

Nevertheless, the service delivered by these Saas (Software as a Service) providers has to be integrated into the IT environment of their enterprise customers. This IT environment is a complex patchwork of servers, network, customs and standards application, security, and user's permissions that can all affect the service delivered by the Saas application to the end user.

It is therefore usual that the following problem arises.

At first, with this situation, enterprises cannot measure the end user experience delivered by the Saas applications because they don't have access to the IT supporting the application anymore (servers, software, etc.) and because they don't have tools that truly reproduce the actions that users are performing with this application.

In addition, enterprises cannot understand the impact of the IT they are responsible for on the end user experience delivered by the Saas applications.

Further, these enterprises cannot easily determine the responsibilities for end user experience issue, namely, is the Enterprise responsible, is the Internet provider responsible, or is the Saas provider responsible?

Saas providers usually provide Service Level Agreement (SLA) that are based on the uptime of the service delivered out of their datacenter but they have no way to control if the service is really delivered with acceptable quality to the end user. This often leads to finger-pointing and bad relationship with their customer any time and end user experience issue arise.

Finally, Saas providers have no unbiased way to prove that the service they are responsible for is really delivered according to the committed SLA.

To face that problem, enterprises and Saas providers rely on different tools that have never been designed to solve the problem.

For example, on the enterprise side, we usually see the use of a large enterprise monitoring tool like Microsoft SCOM (System Center Operation Manager), HP Openview, BMC Patrol, Solarwind, etc. However, these solutions are designed to monitor network, servers and on premise application, and do not provide end user experience measure of Saas application nor any correlation between internal IT issue and Saas end user experience.

Alternatively, the enterprises can be provided with small designed Saas monitoring tool, which provide only the health and availability of the connection to the service and do not measure the end user experience because they do not reproduce end user actions. In addition, they do not test the on premise equipment that can affect the service, they do not measure the impact of the network between the user and the Saas application endpoint and they do not provide any correlation between measures.

On the Saas provider's side, we usually see the use of web application monitoring tool like New Relic, Datadog, etc. However, these solutions are designed to monitor the health and speed of webpage rendering inside their datacenter environment and they do not simulate user's action. In addition, they have no clue of end user IT local environment and they cannot determine root cause of issue between local Enterprise IT, internet or Saas provider.

Current state of the art that provides isolated tests of either network, internet or on premise servers do not provide any insight on the true experience of the end user for the cloud application and therefore cannot determine the root cause of any issue.

The state of the art often provides "agent" that are solely designed to run tests against on premise servers and network component, from a central datacenter or hardware devices.

Overall, the current tools have been designed for a world where everything was on premised and where the enterprises were fully responsible for the service they delivered to their end user rather than for the mix, hybrid environment we are now living in and that will continue to grow in the future.

In this regard, a primary object of the invention is to solve the above-mentioned problems and more particularly to provide a system and a method, which merge true end user experience metrics with internet performance and local IT measures.

Another object of the invention is to provide a system and a method, which understands the quality of the service, delivered to end users.

Another object of the invention is to provide a system and a method which understands the impact of the Internet and local IT on this service.

A further object of the invention is to provide a system and a method, which determines the responsibilities in an unbiased way between the Saas Provider, its customers', IT and their Internet service provider.

SUMMARY OF THE INVENTION

The above problems are solved by the present invention which relates to a computer implemented method, preferably a computer implemented method, and a system, which have been designed to bridge a gap in the End User experience monitoring that has been created by the adoption of cloud based services by Enterprise customers.

The invention provides the following advantages for enterprise customers.

The method and the system of the present invention replicates exactly the actions performed by the user on a cloud based application in order to determine the true end user experience and alert in case of unexpected latency.

The method and the system of the present invention also analyzes at the same time the impacts of the Internet network and the local infrastructure of the Enterprise user on the end user experience of the cloud based application that is monitored.

The method and the system of the present invention provides direct insight on who is responsible for the latency that is experienced (Enterprise, Internet or Cloud service provider) and send all the information to its Rabbit MQ Bus. Rabbit MQ is an open source message broker software that implements the Advanced Message Queuing Protocol (AMQP). The Advanced Message Queuing Protocol is an open standard application layer protocol for message-oriented middleware. The defining features of AMQP are message orientation, queuing, routing (including point-to-point and publish-and-subscribe), reliability and security.

Using Rabbit MQ as a central core of communication between the users of the present invention allows the information they provide to be directly operated by any enterprise on premise or cloud application connected to the bus.

The user of the present invention is independent from any other monitoring tool used in the enterprise company to collect information about health and performance of the cloud service.

The user of the present invention is able to send alerts and information to the main monitoring tools used by the company like SCOM, BMC Patrol, HP Open View, Microsoft OMS, etc. or any third-party services.

On the other hand, the method and the system of the present invention provides advantages for Saas providers in that they can now have an unbiased measure of the service that is really experienced by the customers.

Further, thanks to the method and the system of the present invention they can easily help them determining the root cause of the latency that they experience without having to spend endless time in finger pointing and they can predict the performance that will be delivered even before starting to deploy their services at their customer and can help their customers having their IT infrastructure and Internet connection ready to guarantee a level of performance to the end users.

Therefore, the method and the system of the present invention helps the user in saving thousands of hours of tickets and customer management.

BRIEF DESCRIPTION OF THE DRAWINGS

Further particular advantages and features of the invention will become more apparent from the following non-limitative description of at least one embodiment of the invention which will refer to the accompanying drawings, wherein.

DETAILED DESCRIPTION OF THE INVENTION

Figure 1:
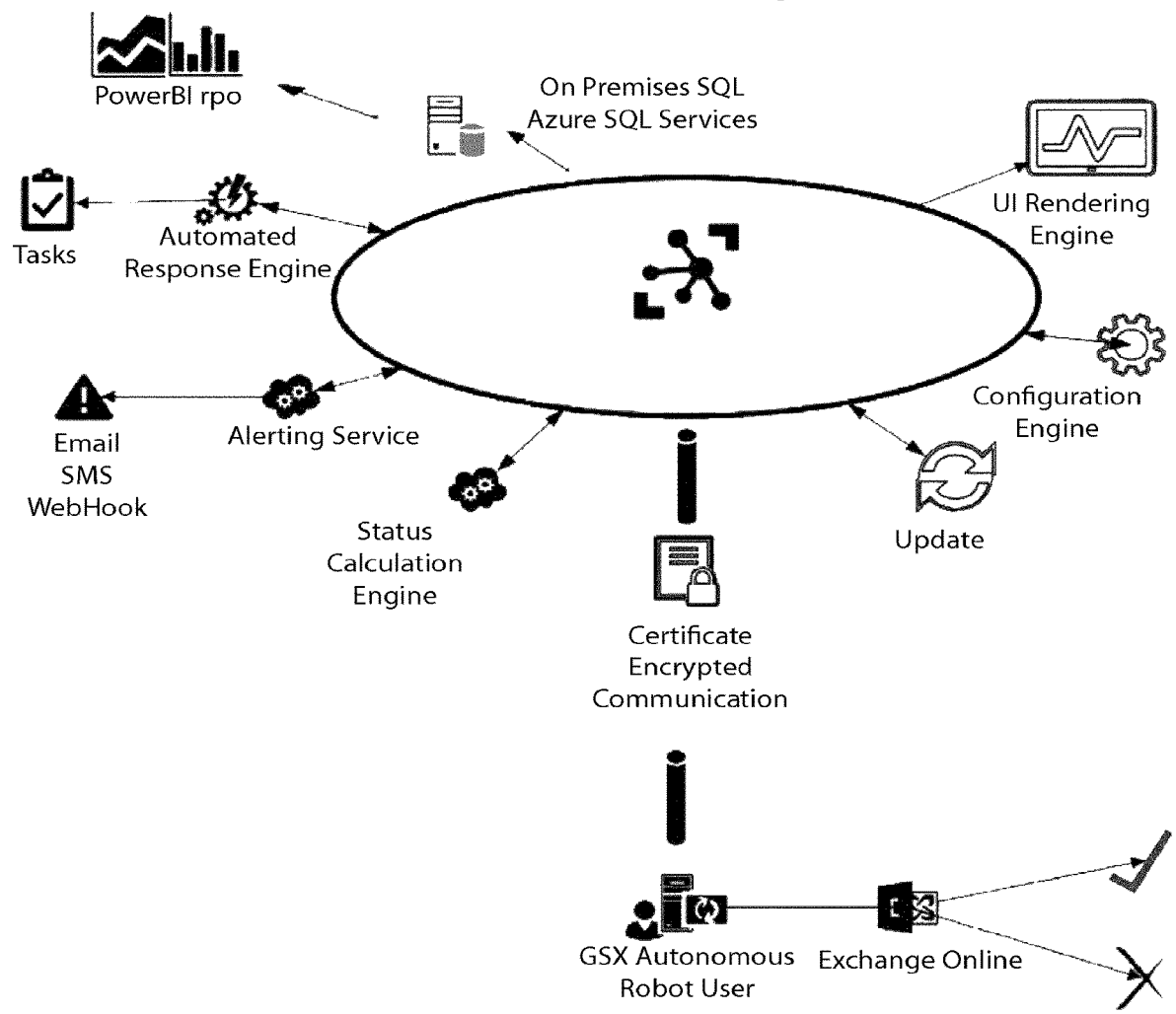
FIG. 1 represents the interaction between the robot user of the present invention and the other different services benefiting from its actions.

The present detailed description is intended to illustrate the invention in a non-limitative manner since any feature of an embodiment may be combined with any other feature of a different embodiment in an advantageous manner.

The method of the present invention is carried out by a relatively small piece of computer program (average 8 MB) that can be manually or automatically deployed on multiple target machine (Virtual Machine, Workstation) to be as close to the user as possible. The purpose of the computer program, which will be called "Robot User" in the following description, is to sit where the users are, in the location, in their building and to use the Cloud application the way users are doing. While doing that, the Robot User also analyzes the network and internet to collect critical information to understand any performance issue.

This unique ability to test the service as a real user from where the users are, combining Cloud end user scenario hybrid components tests (on premise servers) and network/internet performance provide the user with a clear understanding of the service delivered to its end users and critical information to troubleshoot any issue.

In the following description, we will describe the Robot User so as to explain how the Robot Users are communicating on the network, its Internal architecture (2 different services and provides the characteristics of each of these services), explain in detail the actions that are performed to monitor the first Saas application that the Robot User targets, e.g. Microsoft Office 365 and hybrid component, explain in detail the network and internet tests that are performed by the Robot User in complement of the specific Office 365 tests. These tests will always be made in addition to any other Saas application that the Robot User will be able to monitor in the future.

We will first describe the robot user architecture.

The Robot User is designed to be a "stand alone" product. Its Rabbit MQ central Bus core makes it directly usable and connectable on Microsoft Azure applications and Microsoft OMS, for example. The Robot User provides results and alerts to any Rabbit MQ compatible environment and/or any SQL database reader. It can be attached to additional tools such as reporting tools, advanced configuration tools or real time viewer display.

As explained, the Robot User is made to be installed on a machine (virtual or physical) next to where the users really are. To be able to communicate in this environment, the Robot User preferably meets a certain number of requirements:

1) For the Robot User to function in cloud scenarios, restricted firewall scenarios and scenarios where Managed Service Providers (MSP) will use them to deliver monitoring services to their own customers, network communications between the Robot Users and the Rabbit MQ bus must be initiated from the Robot Users, calling to the Rabbit MQ Bus, using standard HTTP (Hypertext Transfer Protocol: is an application protocol for distributed, collaborative, and hypermedia information systems. HTTP is the foundation of data communication for the World Wide Web) or HTTPs protocols (secure version of the same protocol).

2) Robot Users need to be able to report results back to the Rabbit MQ Bus on a scheduled interval. The bus distributes the information to the SQL database (Structured Query Language is a domain-specific language used in programming and designed for managing data held in a relational database management system) that caches the most recent results so they can be evaluated at the next alerting window.

3) When the alerting window is reached, the alerting service evaluates the results received in the specified time (e.g. last 5 minutes) and use these results for determining if an alert condition exists.

4) No inbound TCP ports (The Transmission Control Protocol (TCP) is one of the main protocols of the Internet protocol suite) may be open on the robot user system.

5) Networking ports are configurable. This applies to both the port on which the server is listening and the port used by the Rabbit MQ Bus. Preferably a standard .NET config file (.NET Framework is a software framework developed by Microsoft that runs primarily on Microsoft Windows) should have the URL (A Uniform Resource Locator also known as web address that is a reference to a web resource that specifies its location on a computer network and a mechanism for retrieving it) of the Rabbit MQ Bus and the port number easily accessible so that it can be reviewed and modified.

After the short review of the network constraints that the Robot Users need to challenge above, here is a description of the preferred embodiment of the internal architecture of this piece of computer program:

The Robot User is preferably separated into two services. A "master" robot user (MRU) service and a worker robot user service (WRU). The MRU is installed and always runs as local system. This master robot user is responsible for two key tasks:

Communicating with the Rabbit MQ Bus, and
Downloading and installing WRUs including managing updates to the WRU.

Upon a new installation, the MRU then call the Rabbit MQ Bus and identifies the configuration needed. The master service downloads the "worker" robot user (WRU) service, and install this service running as whatever end-user account that has been defined. The master service then checks on a defined interval for updates to the configuration. If an update is found, the master service downloads the new robot user configuration, and reconfigure or even reinstall the WRU.

Making communications with the Rabbit MQ Bus the responsibility of the MRU also provides us with a model for integrating the Robot User with other platforms such as Microsoft OMS, Microsoft Azure and other Independent Software Vendors.

We will now first explain in detail the characteristic of the Master Robot User before doing the same with the Working service.

The Robot User Master service is designed to run as local system at times, it is able to download files for worker robot user installation and subsequent updating of WRU. In addition, it is able to Install Windows services, remove Windows services, and update Windows services. It transmits results to the Rabbit MQ Bus from the WRUs.

It is installable as a MSI file (that is a software component and application programming interface of Microsoft Windows used for the installation, maintenance, and removal of software. The installation information, and optionally the files themselves, are packaged in installation packages and commonly known as "MSI files", from their default filename extensions) so that customers can use Active Directory (centralized domain management), third party installers, etc.

It encompasses a file download mechanism is capable of downloading files of any size.

It has the ability to execute "admin" PowerShell commands (task automation and configuration management framework from Microsoft, consisting of a command-line shell and associated scripting language built on the .NET Framework).

Installation Principles:

The Master Robot User package must be available as a MSI installer.
MSI use the default % ProgramFiles % location.
MSI accept parameters for command line installation.

The master robot user has a defined polling interval. This is not to be confused with the intervals set on the individual simulations or alerts. The polling interval is the maximum amount of time between the MRU calling the Rabbit MQ Bus. Generally, the Polling Interval has a default value of 5 minutes; the polling intervals are stored in the .NET config file so that it can be edited easily if needed. Finally, they are adjustable.

In order to check the health status for MRU, an alert service tracks on the Rabbit MQ Bus when MRUs do not contact the server when expected. This requires that the alert service is aware of the current polling interval set to the MRU, and it is also aware of the last contact time. The Alert service considers an MRU to be "down" after it has missed two polling intervals. This is a recommended value. However, it is configurable and alerts for a down MRU can be muted on a system-by-system basis.

We will now first explain in detail the characteristic of the Robot User WRU Service (Working Robot User).

It consists in a service running next to the MRU and that is responsible for performing the end user simulation tests, local IT tests and Internet bandwidth tests. The WRU embeds API & technologies that allow it to reproduce the use of either a Fat client (on premise) for the Cloud application or directly a browser for pure web Saas providers. The WRU runs its tests, collect the data and makes it available for the MRU to communicate with its Rabbit MQ Bus. The WRU uses the same protocols that a normal user would use to reproduce perfectly its actions on the targeted Saas application—see next paragraph "example of application". The WRU can run end user's simulation on multiples Saas applications at the same time as well as performing network and internet performance tests. Preferably, the frequency of every action performed can be defined by the users.

We will now describe a first application of the Robot User WRU service, which relates to Microsoft Office 365 end user experience analysis.

The Robot User WRU service is focusing its actions on three areas in order to solve the problem exposed earlier: The availability of the service directly provided by Microsoft Office 365 (measured with end user experience simulation), the hybrid components availability and performance (some compulsory some optional to run Office 365 services) and the Network & Internet availability and performance. The Robot User has this unique ability of being able to tests and collects every critical information needed by the Service delivery manager to understand the quality of the service and the reason why it fails when it fails.

1) End User Experience of Office 365

The WRU is using PowerShell command as well as Microsoft API (Application programming Interface) & protocols to reproduce exactly what a user can do with the main Office 365 services. The four main services that the Robot User tests are Microsoft Office 365 Exchange online, SharePoint online, Skype for Business online and OneDrive. Additional services (Microsoft Teams, Microsoft Intune, etc. can of course be added in the future).

Each scenario performed by the Robot Users WRU service tests the availability of the feature and as well, its performance by calculating the time it takes to perform each scenario. The information is then processed and sent through the Master Robot User service to the Rabbit MQ Bus.

The current end user scenarios can be for example, for Microsoft Exchange online: create an email, send email, create task, create folder, free/busy availability (for calendar availability), Create meeting, Full Mail Routing trip such as: Internal: email going from one mailbox to another that can be either on premise or in the cloud, or External: email going outside of the company domain on an echo service on internet that send the mail back to the expedient, performing then a full external round trip), etc.

Alternatively, the current end user scenarios can be for example, for Microsoft Skype for Business online: login to Skype for Business online as a user, instant Messaging, sending a message via Skype IM service, voice call simulation, initiating a call between 2 Skype for Business online users, additional scenarios can of course be generated.

Furthermore, the current end user scenarios can be for example, for Microsoft SharePoint online: login to SharePoint online service as a user, upload a document to a SharePoint online library, download document from a SharePoint online library, additional scenarios will come in the future.

As a last example, the current end user scenarios can be for example, for Microsoft OneDrive: login to OneDrive Service, upload document to a OneDrive library, download document from a OneDrive library.

2) Hybrid Component for Office 365

Office 365 deployment involves on-premise server's components that are compulsory (Microsoft Azure AD Connect & ADFS) or optional (Microsoft Exchange, Skype for Business and SharePoint on premise servers). To be able to understand if a performance issue is coming from these on-premise servers, the Robot User WRU services is able to test multiple critical components of these servers.

For Microsoft Azure AD Connect, which is a tool and guided experience for connecting on premises identity infrastructure to Microsoft Azure AD, it is critical to link the on-premise identities to the one in the cloud. It implies the following steps:
 Synchronization: the Robot User checks constantly the time and duration of the last synchronization between on premise and cloud identities.
 Server performance: the Robot User retrieves server's performance counters that allow the user to understand the health of the server.
 Network performance: the Robot Users performs a series of network availability and performance test from where it sits to the Microsoft Azure AD server to detect in bottleneck in the network. See Network availability and performance explanation below.

For Microsoft ADFS which provide users with single sign-on access to systems and applications located across organizational boundaries and then between on premise and cloud applications, the Robot user carried out the following steps:
 Certificate: Robot User WRU service constantly checks if the certificates need for authentication are about to become out of date.
 Activity & usage statistics: The Robot User retrieves a series of counters that enable the user to understand the activity of its ADFS server (load) and its usage (by type of token for example).
 Authentication simulation: The Robot User is performing a real authentication on a target endpoint in order to determine the ability of the server to process end user authentication. It collects the availability of the services and its performance.

For Exchange hybrid on premise server, even if keeping Exchange on premise server is not required, it is extremely common for multiple reasons (security, customization, etc.). The overall Exchange service is then provided by a combination of Microsoft Office 365 Saas service and Microsoft Exchange server on premise. It is then extremely important to understand if on premise equipment are affecting the overall end user experience. The Robot User WRU is able to check that by carrying out the following:
 End User scenarios: The Robot User is able to perform on Microsoft Exchange server on premise the same scenarios described for Office 365 Exchange. It allows the user to understand if there is any difference of end user experience between on premise and cloud services.
 Availability & performance statistics: The Robot Users connects to the Microsoft Exchange server in PowerShell to verify its availability and retrieves a series of critical counter that allow the user to understand the health and usage of the server.
 DAG availability & performance metrics: If a DAG is configured (Database Availability Group that allows Mailboxes databases clustering), Robot User is able to perform a series of test to understand the availability of the service delivered by the DAG and its usage (number of mailbox databases, size, etc.).

For Skype for Business on premise server, the Robot user carries out the following steps:
 End User scenarios: The Robot User is able to perform various end user scenarios that test the availability of the services delivered to the end users. These scenarios include but are not limited to Instant Messaging test, Voice over IP tests, Presence test, and critical core service tests.
 Specific performance counters: The Robot User is also able to retrieve a series of performance and usage counters that allow the user to understand the health of the servers and how it is used.

For SharePoint on premise server, the Robot user carries out the following steps:
 End User scenarios: The Robot User is able to perform various end user scenarios that test the availability of the services delivered to the end users. These scenarios include but are not limited to Web services scenarios (copy a document, alerts availability, webpart display, etc.), Farm scenarios (create a blog, resolve a user, search services, upload document, etc.).
 Specific performance counters: The Robot User is also able to retrieve a series of performance and usage counters that allow the user to understand the health of the servers and how it is used.
 Microsoft SQL for SharePoint availability and usage: The Robot User is able to access to the Microsoft SQL server attached to SharePoint in order to test the ability of the database to respond to the service. It also measure key counter for the user to understand how the database is used by the application.

3) Network Analysis, Internal and External

For every end user experience of cloud application that the Robot User monitors, it also tests and measure Network availability and performance. This unique availability allows the user to understand if an end user performance issue is the result of network or Internet problems.

The correlation of the tests and results provides the Robot User with a unique capability to understand any bottleneck in the route to the cloud service.

In order to check the network availability, the Robot user is able to monitor the following:
 Port availability: connectivity to specific port needed to access the Office 365 services
 Round trip ping: perform a connectivity ping and track the time it takes DNS availability: try to access to the specific DNS for Office 365 (Domain Name System on Internet)

Of course, other tests can be chosen

In order to check the network performance, the Robot user is able to monitor the following:

Traceroute: It is a computer network diagnostic tool for displaying the route (path) and measuring transit delays of packets across an Internet Protocol (IP) network. The traceroute test retrieves the number of hops (number of locations the information is going to through its route to Office 365) and the time it takes between each hop.

DNS performance: calculate here the DNS Resolution time that measure the time it takes for the URL to be converted into the IP address of the target Office 365 entry point.

Packet loss (Packet loss occurs when one or more packets of data travelling across a computer network fail to reach their destination). Packet loss is measured as a percentage of packets lost with respect to packets sent.

Jitter calculation (variation in latency as measured in the variability over time of the packet latency across a network) and MOS calculation (Mean Opinion score: commonly used measure for video, audio, and audio-visual quality evaluation, but not restricted to those modalities)

Of course, other tests can be chosen

4) Internet Bandwidth

The Internet bandwidth plays a large part in the performance of the service deliver to the user. As the Robot User sits where the users are, it can detect if any end user experience issue is directly related to a bandwidth problem of the internet provider.

It can measure of the real Internet bandwidth (In computing, bandwidth is the bit-rate of available or consumed information capacity expressed typically in metric multiples of bits per second):

From Robot User to endpoint target: Robot Users measure the Internet bandwidth available between where it sits (at customer's location) and a reference endpoint on Internet. It allows the Robot User to know if an end user performance problem is directly linked to an Internet bandwidth and provider issue.

Between two endpoints: In this case, the Robot User is measuring the Internet bandwidth between where it sits and another Robot User. It allows the Robot User to detect specific bottleneck between two sites relying on different Internet providers for example (two different countries for example).

All these tests and their correlation done by the Robot User, pushed in the Rabbit MQ bus and analyzed by the alert services enable the Saas Enterprise customer and Saas providers to understand what is the true end user experience delivered by this first target application (Microsoft Office 365) and where is the issue when one is detected (Saas provider, local IT, Network, Internet provider).

The Robot User, by combining and correlating these tests with true Saas application end user simulation, can identify performance issue and pinpoint where they come from, solving the biggest issue Enterprises Saas customers and Saas providers have to understand and improve the quality of the service really provided to their end users. Further, the Robot User is mainly designed to run end user simulation against cloud application while analyzing the impact of network & servers component that can affect the cloud application end user experience.

The Robot User, later called ARU for autonomous robot user, subject of the present patent application is developed to run in highly distributed environment and with the most common form of Saas architecture. For that, it combines a specific internal design represented in FIG. 2 with a high resiliency architecture.

On the other hand, the subject of FIG. 1 is to explain the interaction between the ARU and other services able to benefit from its actions. As explained above, the second figure describes the internal architecture of the ARU.

The last figure describes the interaction of the ARU with an external environment that it is supposed to test. As a first example, we will explain how it interact with Microsoft Exchange (online or on premise).

To achieve high flexibility and potential connection to highly complex Saas environment, the ARU is designed to works with Micro-services architectures.

More particularly, the ARU is a platform consisting of resilient micro-services that are designed to effectively, and automatically execute simulated user activities from multiple locations.

On the FIG. 1, every part of the architecture is a micro services working with an AMQP bus.

The AMQP is queuing protocol (Advanced Message Queuing Protocol) that is an open standard application layer for message-oriented middleware. The defining features of AMQP are message orientation, queuing, routing (including point-to-point, publish, and subscribe), reliability and security.

Here, on the figure, the Automated Response Engine, the Alerting Service, the Status Calculation Engine, the Update service, the Configuration Engine and even the UI rendering Engine are designed as micro services that can be installed either on a server or directly in the cloud.

The Autonomous Robot User itself is designed as a Micro-service able to communicate via the AMPQ protocol to IoT (internet of Things) bus. Each of the micro-service can be replaced by any other service working with AMQP. Therefore, it can be fully integrated in any AMQP infrastructure.

The purpose of the micro service architecture in which the ARU is working is to allow self-expansion bas upon load. For example, the alerting service can be expanded to bring up additional instances of itself when there is a need (plenty of alerts arriving at the same time). This architecture is designed to be smart about the load and to be carefully responding to it.

To conclude on this point, the ARU is able to work with any other ecosystem of services that are using the same AMQP BUS. That is why it is autonomous. That is a major difference with anything on the market.

The AMQP is used to provide a highly secure internet protocol that is a key component of the IoT architecture. This is a true internet standard that enforce security and provide modularity and is fully expandable.

It is also used with the ARU because it enables asynchronous communication between the Robot and the IoT bus (also called Hub).

The IoT hub uses device-to-cloud telemetry data to understand the state of the Robot Users while providing high availability of the message delivery. ARU message can be sent in a durable way to accommodate Autonomous Robot User that are connected with bad network. Then ARU can just drop the result of its test that are messages in encoded JSON. The JSON (JavaScript Object Notation) is an open-standard file format that uses human readable text to transmit data that is very commonly used for asynchronous communication. The message can then stay on the bus and be picked up by any micro-services that needs it. Therefore, the communication between the ARU and the bus is only in one direction. The Autonomous Robot User always connect to the IoT bus via AMQP. It is never the contrary. During that connection, the ARU can also retrieve important information for itself (upgrade, new configurations, credential, etc.).

From a security point of view, the communication between the ARU and the IoT bus requires certificate, using a client certificate methods. Every ARU gets issued a unique certificate that the bus will trust. The purpose of it is that if anything goes wrong from a security standpoint, the simple removal of the certificate will deactivate the ARU, i.e. it will not be able to communicate anymore with the bus.

The administrator of the Robot User is able to use either an on premise certification authority or a cloud based Certification authority. The bus itself get the Certificate from the same Certification authority. Therefore, it knows to trust it. No password is needed and this cannot be hacked.

Thanks to this security process, the security is strong, based on a minimum of 2048 bits encryption. The certificate is installed directly with the ARU thanks to an installer package bundling the certificate.

Figure 2:
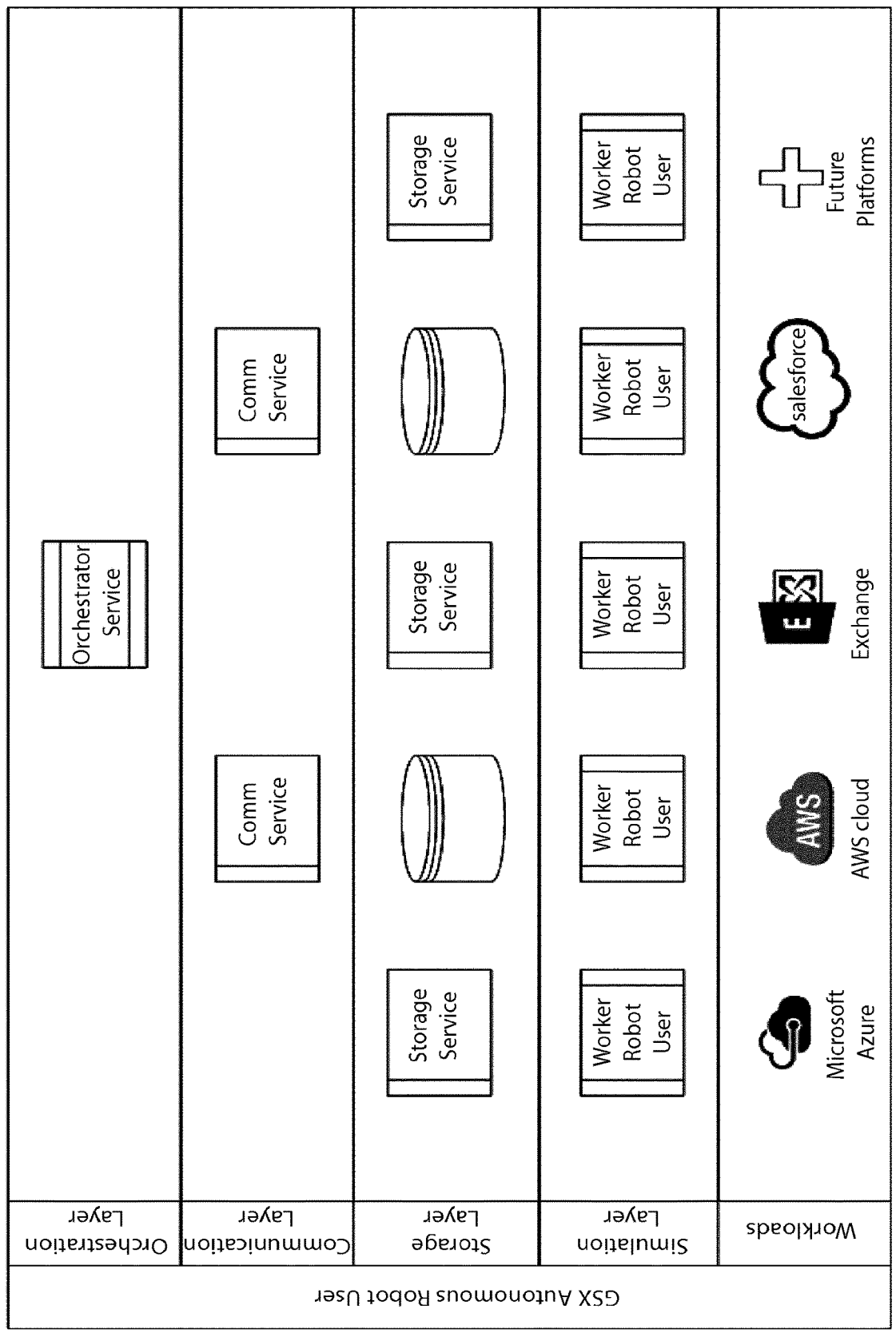
FIG. 2 represents the internal architecture of the Robot User of the present invention.

We will now describe in detail the internal architecture of the Autonomous Robot User with reference to FIG. 2.

The ARU comprises several layers, i.e. an orchestration Layer, a simulation layer, a storage layer and a communication layer. These layers will be described below.

The orchestrator layer or orchestration service is responsible for monitoring the overall health of the Advanced Robot User platform. This service has three primary responsibilities:

Register the ARU with the chosen implementation, either in the cloud or on-premises Maintain system health, including:

Installing all other chosen services, including performing any tasks required to prepare the target operating system as needed, Updating services when new simulation capabilities or configurations are deployed.

Removing the chosen services when no longer required

Repairing/Reinstalling malfunctioning or failed chosen services

Provide a "heartbeat" back to the IoT Hub

The orchestration service is designed to be lightweight and easy to install in a variety of configuration scenarios. As such, the orchestration service is deployed as a small service. The installation requirements are as follows:

If Deployed as a MSI file, it shall be designed to be installed by Active Directory in most cases, it must be deployable by a group policy object (GPO), it must have a UI that displays if the MSI is double clicked.

Upon installation, the orchestration service will register with the chosen IoT hub, and initiate download of the most up-to-date versions of ARU platform. The orchestrator will install these components and ensure that the system is fully prepared to execute user simulations.

When the system is fully prepared for simulations, the orchestrator will download and implement the user simulation parameters from the IoT hub.

These services allow the GSX Robot User customer to install as many ARU on their network with little to no incidence on the bandwidth and in a maximum security environment.

The Simulation Layer or simulation Service comprises the core of the intelligence in ARU platform. The simulation service's tests are designed to validate if anomalies are occurring in the environment, and to pinpoint what user tasks are being affected by the current issues.

Upon receiving environment configuration detail from the orchestration service, the simulation service will begin executing a battery of tests against the target environment. The simulation service does not need access to the orchestration service or the IoT Hub in order to perform its tests. The simulator is fully autonomous and will continue to execute a battery of tests, even if the hub has become temporarily unavailable.

In a common configuration, the ARU platform may contain several simulator services. This is to ensure that one can execute accurate tests against any platform, at any time. The presence of two disparate platforms will not negatively affect the simulations service. The platform is intelligent enough to instantiate and isolate separate simulation engines on demand without negatively affecting the results between simulations.

The Storage layer or storage Service is a repository for simulation results. It is designed to ensure that at no time are simulation results lost due to network communication issues or functional failures with other ARU micro-services. The storage service uses a combination of in-memory storage and disk-backed storage to ensure performance and resiliency. All results—both in memory and on disk—have been encrypted and can only be decrypted on the GSX IoT Hub.

Multiple instances of the storage service can be instantiated on a system running the ARU platform to provide additional performance and/or redundancy.

The Communication layer or Communication Service is responsible for transferring results from the storage service to the IoT Hub. This micro-service is architected to be an interchangeable module. The default communications service operates on IoT Hub's default communication protocol—AMQP over TLS. However, this service can be exchanged for any desired communication module, HTTPS for example.

As the communication service is the module providing the key network interactions, this service is isolated by design. All data being accessed by the communication service is pre-encrypted. The communication Service has no access to the keys used to encrypt the scan configurations or simulation results. This service can quite simply transfer results to the target instance of GSX IoT Hub.

The service is also operating in a low-privilege context, with no access to any interfaces in the operating system. Even in a scenario where the communication service was fully compromised, this service would yield no unencrypted data and would not provide an opening to other parts of GSX's code or the operating system as a whole.

Figure 3:
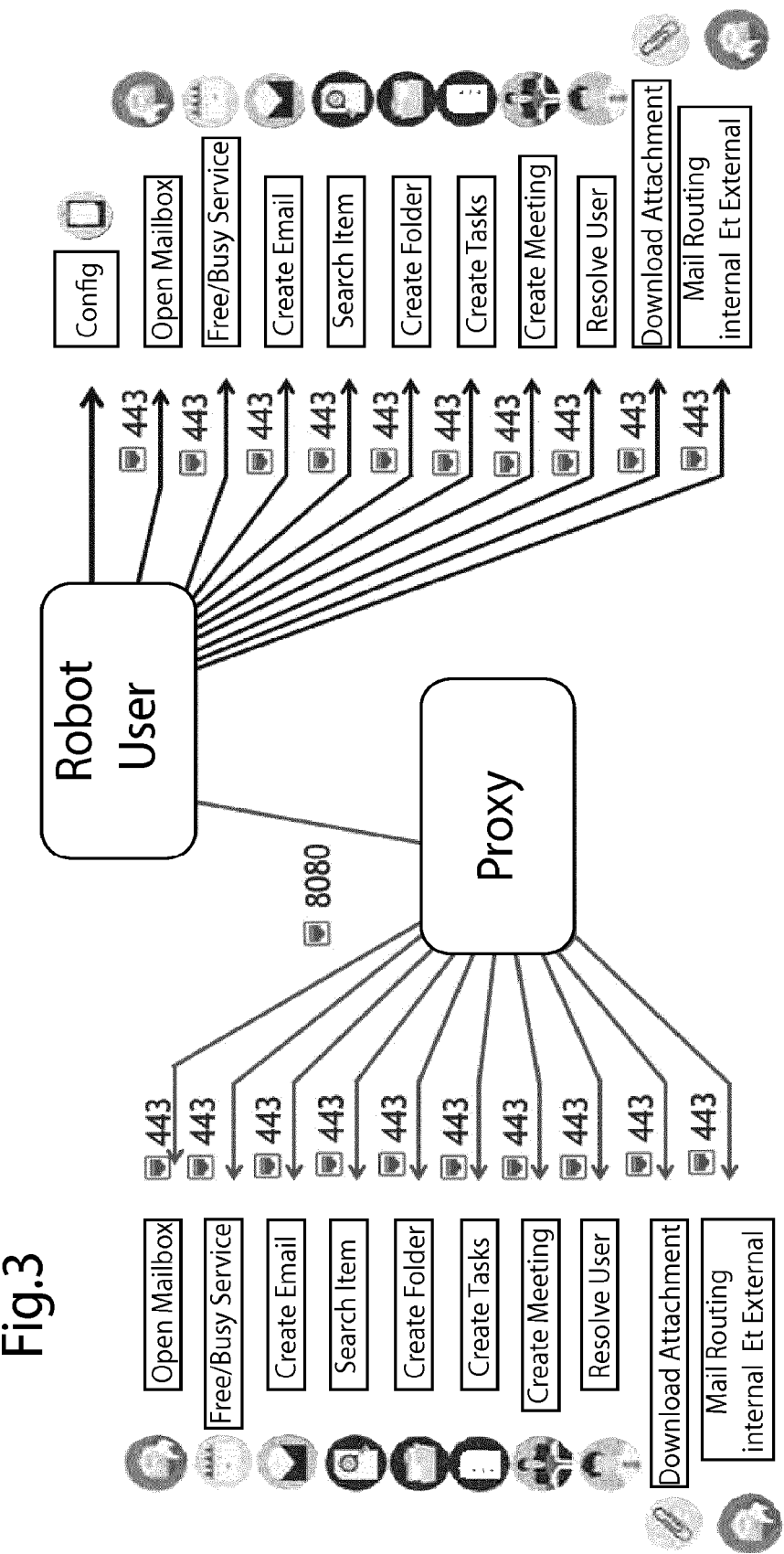
FIG. 3 represents the Robot User interactions.

In order to understand how the Autonomous Robot User is interacting with the outside environment that it has to test, we present now the FIG. 3 that explains in detail how the simulation service of the ARU is working with an external environment that it tests.

The Autonomous Robot User is ".net" application that manipulates the client dll of a Saas application (Dynamic-link library—Microsoft implement of the shared library concept). ".net" designed a software framework developed by Microsoft that runs primarily on Microsoft Windows. It provides a large class library and provide language interoperability across several programming language.

In the example we are describing here, the Robot User is using Microsoft Outlook dll to reproduce a Microsoft User's action—call the dll and make sure they are performing what the Robot User want to do.

As shown in the first figures, and explained in the FIG. 2, the ARU receives Configuration (via the configuration service) that described precisely the backend configuration of the service to test (end point, the route to access it and the language to use to access it) as well as the user actions to performs.

For each action, the backend configuration always provide the same type of information to the Robot User:

The endpoint: what the ARU has to reach (can be the URL of a service or a server)

The route to access: What are the equipment's the action performed by the ARU has to cross:

Proxy—as shown in the figures

Packet inspection de appliances

Security appliances (malware, antispam, etc.)

The language to speak to the service I server to perform the actions. In this example for Microsoft Exchange:

MAPI over HTTP (Messaging Application Programing Interface encapsulated in the HTTP protocol)

EWS (Exchange Web Services)

RCP over HTTP (Remote Procedure Call encapsulated into HTTP)

ActiveSync (Microsoft protocol to connect mobile devices to Microsoft

Exchange)

Which port to connect: most of the time port 443.

On the other hand, from the user action perspective, the ARU receives different instructions for each action:

Open Mailbox:

Which mailbox to target

Which credential to use

How to connection to the end point (manually configured or automatically discover by the autodiscover)

How to authenticate (through Azure Active Directory or through Microsoft ADFS

Active Directory Federation Services)

How to retrieve the authentication token and get the mailbox properties to perfectly simulate the opening of the mailbox through the outlook client Free/Busy Which is the first mailbox Which credential to use How to connect and authenticate to the end point Which other mailbox to look for Date to look for an event Status of this mailbox at that date (free, busy or other)

Create email:

Which is the mailbox to target

Which credential to use

How to connect and authenticate to the end point

Subject of the email

Attachment

Recipient

Target of the email (save as draft, sent or suppress)

Create Folder/Tasks:

Which mailbox to target

Which credential to use

How to connect and authenticate to the end point

Name of the folder or task

Search item:

Which is the mailbox to target

Which credential to use

How to connect and authenticate to the end point

Which search service to use (like Fastsearch for Outlook 2016 for example)

Search recursively through all folder and sub folders until retrieving the collection of element fitting the criteria)

Create meeting:

Which is the first mailbox

Which credential to use

How to connect and authenticate to the end point

Which second mailbox to target—possible to target a mailbox on premises or online Resolve User Which is the mailbox target Which credential to use How to connect and authenticate to the end point How to look for the user in the Global Address List Retrieve all the properties of the user Make sure the ARU has the permission to look for this other user Download attachment Which is the mailbox target Which credential to use How to connect and authenticate to the end point How to attach the data file to the email Download the entire data set on the machine of the ARU (the same way Microsoft Outlook is doing it) Mail Routing Who is the sender Who is the recipient How to attach an attachment The ARU send the email at regular interval through EWS or SMTP (Simple Mail Transport Protocol)

Verify the reception in the mailbox of the recipient's mailbox

The ARU then analyzes the header of the email to understand the routing hops and the times between each hops Each action performed by an ARU respects the business logic and every steps that would be performed by a real user. Doing that, the ARU is able to address the Saas application as well as the on premises application (Microsoft Exchange online and Microsoft Exchange on premises).

While the embodiments have been described in conjunction with a number of embodiments, it is evident that many alternatives, modifications and variations would be or are apparent to those of ordinary skill in the applicable arts. Accordingly, this disclosure is intended to embrace all such alternatives, modifications, equivalents and variations that are within the scope of this disclosure. This for example particularly the case regarding the different software the ARU tests, and of course the different actions which he can carry out.

The invention claimed is:

1. A method for monitoring a software as a service (SaaS) application located on a cloud-based server and operated from an on-premises location of a user over the internet, wherein the method comprises:

replicating at least one action performed by said user of the SaaS application using a diagnostic tool installed in memory on a computer at the on-premises location of the user by performing tests to provide simulation results, said tests comprising end user simulation tests, local IT tests, and network and internet tests, said tests being operated from the on-premises location of the user and executed on the cloud-based server in order to test the SaaS application from where the user is located; and collecting and storing the simulation results.

2. The method according to claim 1, wherein the diagnostic tool is configured to run a plurality of tests comprising:

one or more end user simulation tests comprising: create an email, send email, create task, calendar availability, create meeting, full email routing trip, upload a document to an online library, and download a document from the online library;
one or more local IT tests comprising: synchronization between premises and cloud, server performance, network availability performance, certificate authentication, server activity and usage, and authentication simulation; and
one or more network and internet tests comprising: port availability, round trip ping, DNS availability, packet loss, jitter calculation, and internet bandwidth.

3. The method according to claim 2, further comprising determining a health and performance of the SaaS application that is experienced by the user based on the simulation results.

4. The method according to claim 3, wherein determining the health and performance of the SaaS application comprises correlating the simulation results, the local IT tests, and the network and internet tests to pinpoint whether performance issues come from the cloud-based server, the internet or the on-premises location of the user.

5. The method according to claim 1, further comprising encrypting the simulation results before transferring the simulation results using a communication service to a hub connected to the Internet.

6. The method according to claim 5, wherein communication between the communication service and the hub is configured to be only in one direction.

7. The method according to claim 1, further comprising performing at least one of the tests for the SaaS application located on a server at the on-premises location to determine when there is a difference of end user experience between on-premises and cloud services.

8. The method according to claim 1, wherein the diagnostic tool is configured to run the simulation tests to reproduce the at least one action by said user while using Microsoft Exchange including: open mail using Microsoft Exchange web services (EWS); create task; create email; create meeting; create folder; search item; send mail; download attachment, upload attachment; retrieve free/busy status; Autodiscover; authentication using Exchange Web services.

9. The method according to claim 1 further comprising generating an alert when the user is experiencing a latency with the SaaS application.

10. The method according to claim 1, further comprising: determining when performance issues are occurring; and identifying each action which are affected by the performance issues.

11. A system for monitoring a software as a service (SaaS) application located on a cloud-based server and operated from an on-premises location of a user over the internet, wherein the system comprises:
a memory for storing instructions, which when executed by a computer cause the computer to:
install a diagnostic tool in the memory using an orchestrator at the on-premises location;
activate the diagnostic tool to replicate at least one action performed by said user of the SaaS application using the diagnostic tool installed on the memory at the on-premises location of the user by performing a plurality of tests to provide simulation results, said plurality of tests comprising end user simulation tests, local IT tests, and network and internet tests, said plurality of tests being operated from the on-premises location of the user and executed on the cloud-based server in order to test the SaaS application from where the user is located;
store the simulation results in the memory; and
transfer the simulation results using a communication service through a communication protocol from the memory to a hub connected to the Internet.

12. The system according to claim 11, wherein the memory includes additional instructions, which when executed by the computer configure the computer to:
determine when performance issues are occurring; and
identify each action which are affected by the performance issues.

13. The system according to claim 11, wherein the communication protocol is an AMPQ or HTTPS protocol.

14. The system according to claim 11, wherein the memory includes additional instructions, which when executed by the computer configured the computer to activate several tests simultaneously.

15. The system according to claim 11, wherein the simulation results are encrypted with an encryption key before the transfer, and wherein the communication service is isolated so as to have no access to the encryption key.

16. The system according to claim 11, wherein the orchestrator and the communication service are in a Master service, and wherein the diagnostic tool is in a Worker Service.

17. The system according to claim 16, wherein the Worker Service makes the simulation results available to the Master service to communicate with a Rabbit MQ Bus.

18. The system according to claim 11, further comprising a platform comprising a plurality of resilient micro-services designed to automatically execute the at least one action performed by the user from multiple locations.

19. The system according to claim 11, wherein the diagnostic tool is configured to run the plurality of tests comprising:
one or more end user simulation tests comprising: create an email, send email, create task, calendar availability, create meeting, full email routing trip, upload a document to an online library, and download a document from the online library;
one or more local IT tests comprising: synchronization between premises and cloud, server performance, network availability performance, certificate authentication, server activity and usage, and authentication simulation; and
one or more network and internet tests comprising: port availability, round trip ping, DNS availability, packet loss, jitter calculation, and internet bandwidth.

20. The system according to claim 19, further comprising determining a health and performance of the SaaS application that is experienced by the user based on the simulation results; wherein determining the health and performance of the SaaS application comprises correlating the simulation results, the local IT tests, and the network and internet tests to pinpoint whether performance issues come from the cloud-based server, the internet or the on-premises location of the user.

\* \* \* \* \*